United States Patent [19]

Jones-Fenleigh

[11] Patent Number: 4,484,718

[45] Date of Patent: Nov. 27, 1984

[54] HAND HELD REEL

[75] Inventor: Edward J. Jones-Fenleigh, Oadby, England

[73] Assignee: Invicta Plastics Limited, Oadby, England

[21] Appl. No.: 455,478

[22] Filed: Jan. 4, 1983

[30] Foreign Application Priority Data

Jan. 12, 1982 [GB] United Kingdom ............... 8200794

[51] Int. Cl.³ ..................... B65H 75/40; B65H 75/36
[52] U.S. Cl. .......................................... 242/96; 242/86
[58] Field of Search .............. 242/96, 85, 86, 86.2, 242/86.4, 94; 308/DIG. 7; 384/299

[56] References Cited

U.S. PATENT DOCUMENTS

| 2,250,281 | 7/1941 | Sundstrand | 242/96 |
| 2,508,809 | 5/1950 | Allen | 242/96 |
| 2,695,425 | 11/1954 | Stott | 308/DIG. 9 |
| 3,568,947 | 3/1971 | Oprins | 242/96 X |
| 4,239,007 | 12/1980 | Kleykamp et al. | 384/299 |
| 4,306,688 | 12/1981 | Hechler | 242/86 |

FOREIGN PATENT DOCUMENTS

| 923868 | 4/1973 | Canada | 242/96 |
| 695195 | 8/1953 | United Kingdom | 308/DIG. 9 |

Primary Examiner—Stuart S. Levy
Assistant Examiner—Lloyd D. Doigan
Attorney, Agent, or Firm—Charles E. Brown

[57] ABSTRACT

A reel for storing an elongate flexible element (such as a lay-flat hose) comprises a reel body composed of two side parts, each of which has a flange on its outer periphery. The flanges on the two parts extend away from one another and together form a guide track along which a carrying handle is slidable. The handle contains guide grooves in which the flanges are respectively received. A low friction material is provided between the flanges and the guide grooves, and may be in the form of one or more inserts.

14 Claims, 3 Drawing Figures

HAND HELD REEL

This invention relates to a reel for storing an elongate flexible element, such as a lay-flat hose.

In U.K. Pat. No. 1,419,484 there is disclosed a reel for winding up cords or ropes which comprises a reel body of circular configuration having a guide track thereon, and a carrying handle slidingly mounted on the guide track in such a manner that relative movement between the handle and the reel body is permitted. In this reel, the reel body is of annular configuration, the guide track is provided on the inner periphery of the reel body, and the carrying handle is disposed in a generally central position. Because of the space occupied by the handle, the proportion of the overall volume of the reel which is available for storing the rope or cord is necessarily limited.

It is an object of the present invention to overcome this particular drawback.

According to the invention, the guide track is provided about the outer periphery of the circular reel body, so that the carrying handle is slidable along the reel body periphery.

Preferably, the reel body includes a pair of circular side parts which are spaced apart along the main axis of the reel body, the side parts having respective peripheral flanges which together constitute said guide track, and the handle has guide grooves therein in which the flanges are respectively slidingly received. Desirably, the flanges extend away from one another in opposite directions from the side parts.

Advantageously, a low friction material is employed to facilitate sliding of the carrying handle on the reel body, and may thus be provided between each guide track and the respective guide groove. The low friction material can be provided in or on the reel body and/or the carrying handle itself (for example by forming the whole of the handle from such material). Alternatively, it can be provided in the form of at least one insert which preferably spans the two side parts of the reel body so that it locates between both guide tracks and their respective guide grooves. Desirably, two such inserts are provided at positions on the carrying handle which are angularly spaced apart about the main axis of the reel body, although a single insert could be provided extending for at least a substantial part of the lengths of the guide grooves. Conveniently, the low friction material is a plastics material (such as nylon) with a lubricant additive (for example molybdenum disulphide).

The carrying handle can be formed in two preferably identical parts which are separated by a plane generally perpendicular to the major axis of the reel body, these parts desirably being secured together by snap-fitting means. The reel body can similarly be formed in two parts, although these parts will prefereably be secured together by welding, rivetting, bolting or adhesive.

The reel body can have an operating handle mounted thereon for rotation about an axis parallel to and spaced from the main axis of the reel body, so that a user can rotate the reel body by holding the carrying handle in one hand and by turning the operating handle with the other.

The invention will now be further described, by way of example only, with reference to the accompanying drawings, in which.

Figure 1:
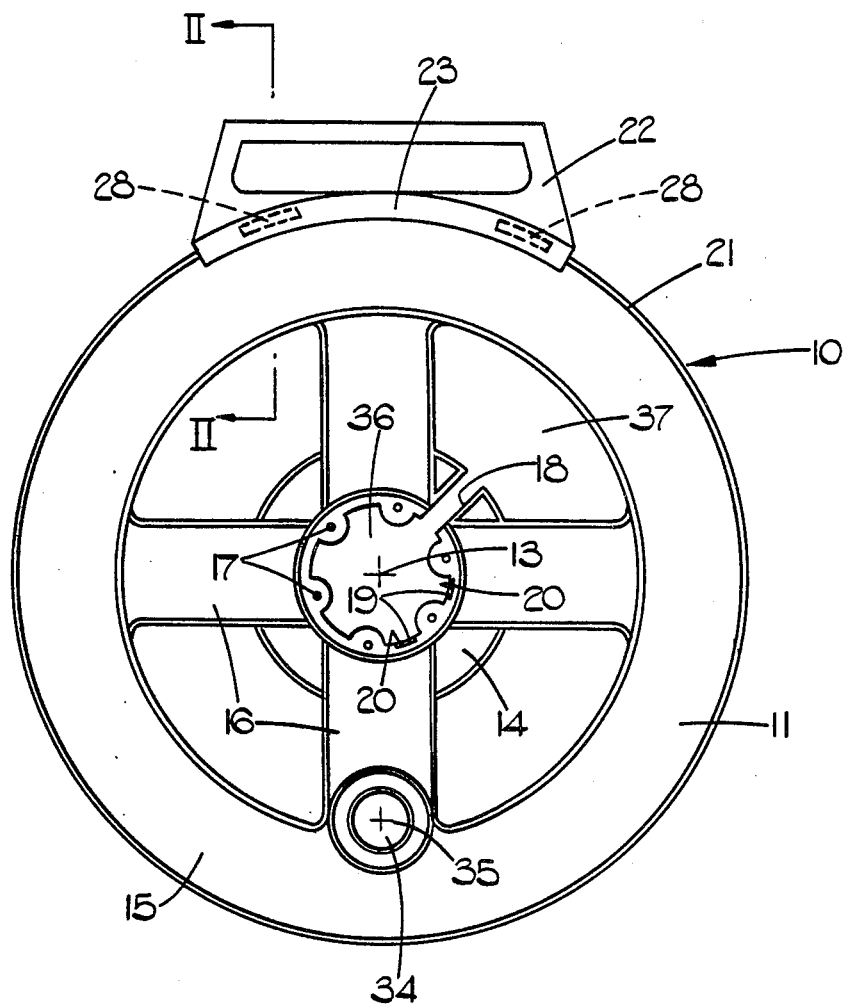
FIG. 1 is a side view of a reel according to the present invention.
Figure 2:
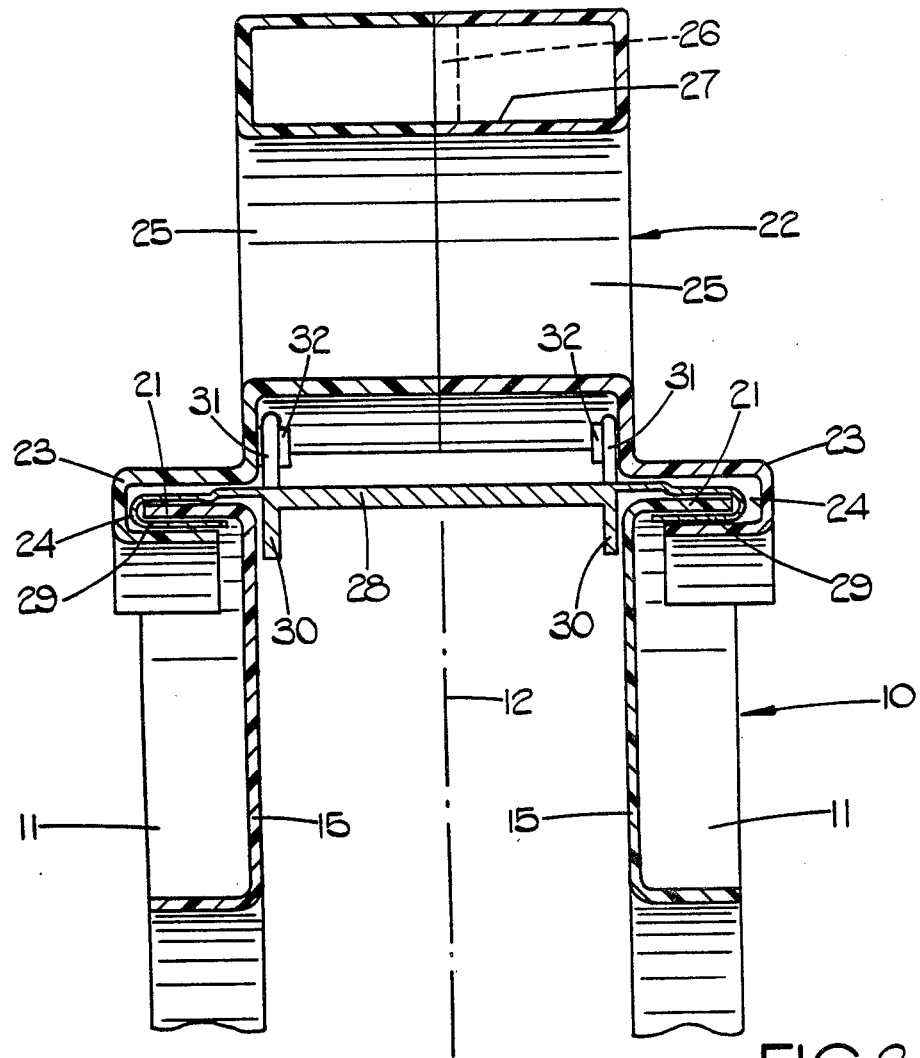
FIG. 2 is a section taken along the line II—II in FIG. 1.

Referring first to FIGS. 1 and 2, the illustrated reel comprises a reel body 10 of circular configuration upon which an elongate flexible element (such as a lay-flat hose) can be stored. The body 10 is composed of two identical side parts 11 which are separated by a plane 12 perpendicular to a main axis 13 of the body. Each of these parts 11 is composed of a hub portion 14 and an annular rim portion 15 which are linked together by radial spokes 16. The two parts 11 are jointed together at their hub portions 14 by means of rivets or bolts 17: alternatively, the parts may be welded or adhered together. Each hub portion 14 has a radial slot 18 therein, and the two side parts 11 are secured together in a relative orientation such that the slots 18 in the hub portions are mutually aligned. In order to ensure that the proper relative orientation is achieved, each side part 11 has projections 19 on its hub portion 14 which locate in corresponding recesses 20 in the hub portion of the other side part. The parts 11 are preferably moulded from plastics material, although they may alternatively be formed from metal or stiff board.

The two side parts 11 are provided with respective flanges 21 on the outer peripheries of their rim portions 15, the flanges 21 extending away from one another in opposite directions from the side parts. The two flanges together constitute a guide track on which a carrying handle 22 is slidingly mounted for movement along the outer periphery of the reel body 10. The handle 22 has two sideways-directed extensions 23 shaped so as to define guide grooves 24 in which the flanges 21 on the reel body are respectively slidingly received. The handle 22 like the reel body is composed of two identical parts 25 which are separated by the aforementioned plane 12, each of the parts 25 having formed thereon projections 26 which engage as a snap-fit in respective recess 27 in the other part. In FIG. 2, only one such engaging projection and recess arrangement is shown. The handle parts 25 are preferably moulded from plastics material.

Figure 3:
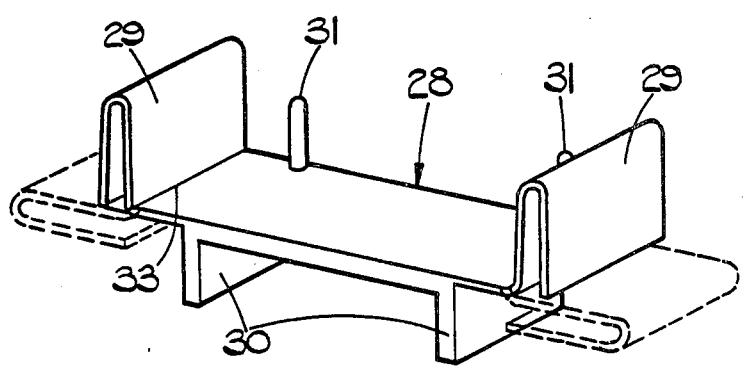
FIG. 3 is a perspective view of a low friction insert which forms part of the reel.

In order to facilitate sliding motion of the carrying handle 22 along the reel body periphery, two low-friction inserts 28 are provided between the flanges 21 and the grooves 24 at positions (indicated by broken lines in FIG. 1) which are angularly spaced about the axis 13. One of the inserts 28 is shown in detail in FIG. 3, the other insert being identical thereto. Each insert is configured so that it spans the two side parts 11 of the reel body 10, and has hook-shaped end formations 29 which locate over the flanges 21 respectively. A portion of the insert between the formations 29 has depending legs 30 which locate between the side parts 11 of the reel body 10, and upstanding locating pins 31 which are received between lug pairs 32 on the handle 22 (only one lug in each pair actually being shown). The pins 31 and lugs 32 serve to locate the inserts 28 against movement relative to the handle 22 as the latter moves along the reel body periphery.

The inserts 28 are moulded from a plastics material having a lubricant additive, for example nylon containing molybdenum disulphide. To facilitate the moulding operation, each insert is produced with formations 29 in an upright position as shown in full lines in FIG. 3, these formations subsequently being flexed downwardly into the positions indicated in broken lines. To assist in this flexing action, each formation 29 is connected to the remainder of the insert 28 by way of an integral hinge 33.

The reel is assembled by first securing together the two side parts 11 of the reel body 10 in the manner described above. The inserts 28 are then placed over the outer periphery of the reel body 10, with the formations 29 being hooked over the flanges 21. Following this, the handle parts 25 are positioned over the inserts 28 such that the locating pins 31 are received between the lugs 32, and with the flanges 21 on the reel body parts 11 being received in the grooves 24. Finally, the handle parts 25 are snap-fitted together.

Instead of providing two separate inserts 28 at angularly spaced locations, a single insert of low-friction material can be employed which extends for substantially the full length of the grooves 24. Alternatively, the inserts can be omitted altogether, with the low-friction material being provided in or on the reel body 10 or the handle 22 itself. In a particular example of this, the whole of the handle 22 is moulded from the above-described low friction material.

Reference numeral 34 designates an operating handle which is mounted on one of the reel body parts 11 for rotation about an axis 35 parallel to and spaced from the axis 13. By holding the carrying handle 22 in one hand and turning the operating handle 34 with the other, a user can cause the reel body 10 to rotate about the axis 13, in order to wind an elongate flexible element onto or off the reel. In use, an end of the flexible element will be received in the aligned slots 18 in the reel body 10. Where the flexible element is a lay-flat hose for example, an end connector on the hose can be received in a central aperture 36 in the reel body with which the slots 18 communicate. The end connector can be inserted in the aperture 36 by moving the handle 22 to a position diametrically opposed to the slots 18, and by forcing the rim portions 15 of the reel body parts 11 apart so that the end connector can be passed therebetween and through a gap 37 between the two spokes 16 which flank the slots 18.

In an alternative embodiment (not illustrated), the handle 22 includes means enabling the reel to be placed upon a supporting surface, rather than being hand held, in order that the user can unwind the flexible element therefrom. For example, the handle may include a spike to enable the reel to be pressed into soft ground.

Although reference has been made above to the reel being used to store a lay-flat hose, it will be apparent that the invention has a much wider applicability than this, and other items such as wire or tube may equally well be stored.

Above, the reel body 10 has been described as being made in two pieces which are secured together: however, if desired the reel body can alternatively be produced as a single-piece item. The same comments apply to the handle 22.

I claim:

1. A reel for storing an elongate flexible element, said reel comprising a reel body having a main axis and including circular side parts having peripheral portions, track means on each of said peripheral portions in fixed spaced relation, a carrying handle in free sliding engagement with said reel by means of said track means whereby said reel is freely rotatable relative to said handle, and means for normally maintaining said side parts in a predetermined spaced relationship such that the element can be wound tangentially on and off said reel between said side parts without frictional engagement between said side parts and said track means and such that friction between said reel and said handle when they are relatively rotated is minimized said track means including peripheral flanges on said side parts extending away from each other in opposite direction from said side parts and said carrying handle having grooves in which said peripheral flanges are respectively, slidingly received.

2. The reel according to claim 1, wherein a low friction material is provided between each of said peripheral flanges and the respective one of said guide grooves.

3. The reel according to claim 2, wherein said low friction material is provided on at least one of said reel body and said carrying handle.

4. The reel according to claim 2, wherein said low friction material is provided in the form of at least one insert.

5. The reel according to claim 2, wherein said low friction material is provided in the form of at least one insert which spans said two side parts of said reel body and which is located between both of said peripheral flanges and said respective guide grooves.

6. The reel according to claim 5, wherein two of said inserts are provided at positions on said carrying handle which are angularly spaced apart about said main axis of said reel body.

7. The reel according to claim 5, wherein a single insert is provided and extends for at least a substantial part of the length of said guide grooves.

8. The reel according to claim 1, wherein a low friction material is employed to facilitate sliding of said carrying handle on said reel body.

9. The reel according to claim 8, wherein said low friction material is a plastics material having a lubricant additive.

10. The reel according to claim 9, wherein said plastics material is nylon.

11. The reel according to claim 9, wherein said lubricant additive is molybdenum disulfide.

12. The reel according to claim 1, wherein said carrying handle is formed in two parts which are separated by a plane extending generally perpendicular to said main axis of said reel body.

13. The reel according to claim 1, wherein said reel body is formed in two parts which are separated by a plane extending generally perpendicular to said main axis.

14. The reel according to claim 1, further comprising an operating handle mounted on said reel body for rotation about an axis which is parallel to and spaced from said main axis.

* * * * *